US007909693B2

(12) United States Patent
Kammler et al.

(10) Patent No.: US 7,909,693 B2
(45) Date of Patent: Mar. 22, 2011

(54) GAMING SYSTEM FOR TRACKING PLAYER ACTIVITY DURING VIRTUAL SESSIONS AT A GAMING MACHINE

(75) Inventors: Keith Donald Kammler, Las Vegas, NV (US); J. Christopher McNamee, Las Vegas, NV (US); Alan Gael Sheldon, Las Vegas, NV (US); Robert L. O'Donnell, Las Vegas, NV (US)

(73) Assignee: Aristocrat Technologies Australia Pty Ltd. (AU)

( * ) Notice: Subject to any disclaimer, the term of this patent is extended or adjusted under 35 U.S.C. 154(b) by 1264 days.

(21) Appl. No.: 10/720,931

(22) Filed: Nov. 24, 2003

(65) Prior Publication Data

US 2005/0054446 A1 Mar. 10, 2005

Related U.S. Application Data

(60) Provisional application No. 60/501,142, filed on Sep. 8, 2003.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ................ 463/25; 463/16; 463/20; 463/21; 463/22; 463/23; 463/24; 463/40; 463/42

(58) Field of Classification Search ..................... 463/25
See application file for complete search history.

(56) References Cited

U.S. PATENT DOCUMENTS

| | | | | | |
|---|---|---|---|---|---|
| 5,265,874 | A | * | 11/1993 | Dickinson et al. | 463/25 |
| 5,429,361 | A | * | 7/1995 | Raven et al. | 463/25 |
| 5,470,079 | A | * | 11/1995 | LeStrange et al. | 463/25 |
| 5,655,961 | A | * | 8/1997 | Acres et al. | 463/27 |
| 5,902,983 | A | * | 5/1999 | Crevelt et al. | 235/380 |
| 5,919,091 | A | * | 7/1999 | Bell et al. | 463/25 |
| 6,048,269 | A | * | 4/2000 | Burns et al. | 463/25 |
| 6,071,190 | A | * | 6/2000 | Weiss et al. | 463/25 |

(Continued)

FOREIGN PATENT DOCUMENTS

EP 0534718 A2 3/1993

(Continued)

OTHER PUBLICATIONS

International Search Report and Written Opinion, PCT/US04/29353, mailing date Jun. 12, 2006, 9 pages.

(Continued)

*Primary Examiner* — John M. Hotaling, II
*Assistant Examiner* — Paul A. D'Agostino
(74) *Attorney, Agent, or Firm* — McAndrews, Held & Malloy, Ltd.

(57) ABSTRACT

A gaming system has a central authority connected to a plurality of gaming machines. Player activity is tracked at the gaming machines during regular gaming sessions and during virtual gaming sessions. Such data is transmitted to the central authority for providing player points in a player account file of a central database. Regular gaming sessions occur between player card insertion and player card removal. Virtual gaming sessions may occur prior to player card insertion as well as after player card insertion. For example, a coin-in event prior to player card insertion will establish a virtual session, and credits remaining on the credit meter at a card-out event will establish a virtual gaming session.

6 Claims, 7 Drawing Sheets

U.S. PATENT DOCUMENTS

| | | | | |
|---|---|---|---|---|
| 6,142,876 | A * | 11/2000 | Cumbers | 463/25 |
| 6,165,071 | A * | 12/2000 | Weiss | 463/24 |
| 6,168,522 | B1 * | 1/2001 | Walker et al. | 463/25 |
| 6,244,958 | B1 | 6/2001 | Acres | |
| 6,371,852 | B1 * | 4/2002 | Acres | 463/25 |
| 6,511,377 | B1 * | 1/2003 | Weiss | 463/25 |
| 2003/0003997 | A1 | 1/2003 | Vuong et al. | |
| 2003/0104860 | A1 | 6/2003 | Cannon et al. | |
| 2003/0162588 | A1 | 8/2003 | Brosnan et al. | |

FOREIGN PATENT DOCUMENTS

| | | | |
|---|---|---|---|
| EP | 1231577 | A2 | 8/2002 |
| WO | WO-02/17251 | A2 | 2/2002 |

OTHER PUBLICATIONS

EP Communication pursuant to Article 94(3) EPC, Ref. EH-48185, Application No. 04 788 644.5-2221 dated Sep. 4, 2009, 3 pages.

* cited by examiner

| Time | Action | CoinIn Meter | CoinOut Meter | Credit Met r | Session Start | Coin In | Coin Out | Time Played |
|---|---|---|---|---|---|---|---|---|
| 06:00 | Player In | 600 | 600 | 0 | | | | |
| 06:10 | Player Out | 620 | 600 | 10 | | | | |
| 06:10 | Sent to CA | | | | 06:00 | 20 | 0 | 00:10 |
| 06:10 | Emp. In | 620 | 600 | 10 | | | | |
| 06:12 | Emp. Out | 620 | 600 | 10 | | | | |
| 06:13 | Player In | 620 | 600 | 10 | | | | |
| 06:20 | Player Out | 650 | 625 | 0 | | | | |
| 06:20 | Sent to CA | | | | 06:10 | 30 | 25 | 00:10 |

FIGURE 3

GAMING SYSTEM FOR TRACKING PLAYER ACTIVITY DURING VIRTUAL SESSIONS AT A GAMING MACHINE

CROSS-REFERENCE TO RELATED APPLICATION

This application claims the priority of U.S. Provisional Application No. 60/501,142 filed Sep. 8, 2003, the disclosure of which is incorporated by reference herein in its entirety.

STATEMENT REGARDING FEDERALLY SPONSORED RESEARCH OR DEVELOPMENT

Not applicable.

BACKGROUND OF THE INVENTION

The present invention relates to gaming systems, and more particularly relates to tracking of a player's gaming activity during a virtual session at a gaming machine.

Player tracking is well known in the art in which gaming activity of the individual player is tracked at each gaming machine and communicated to a central computer which calculates player points in the player's account. The central computer identifies the account to accumulate points and other statistics (bills inserted, coin-in, coin-out, etc.) based upon the player's identity which is typically provided by the player inserting his or her player card into the gaming machine.

As understood, player points and statistics are not accrued for a game player who does not have his or her player card inserted into the gaming machine. For example, a player may insert coins into the gaming machine prior to inserting his or her player card. Such pre-card coins would not be credited to the player. Also, the player may remove his or her player card from the machine prior to the completion of the present game in play. Also, the player may remove his or her player card with credits remaining on the credit meter prior to cash-out. In such cases, player tracking points may not be accounted correctly to the particular player.

Player tracking points programs allow a player to earn "comps" (complimentaries) as for example a hotel room upgrade, a free room, buffet, dinners, shows, etc. In some cases, points may be converted to game credits for additional game play.

Without proper tracking, players lose points they might normally receive or gain more points than they might normally receive. In addition, casinos use player tracking information as valuable marketing information. Such marketing information may be misleading or lost to the casino if players cannot be properly tracked.

Player tracking points refers to a numerical quantity which is obtained based on participation in an activity at a gaming establishment. Such gaming activities including playing gaming machines, table games, betting on events, and other activities which may result in player tracking points.

With respect to gaming machine activity for accumulating player tracking points, a tracking session typically begins when the player inserts his or her card into the card reader of the particular gaming machine. Card insertion is automatically detected by the gaming machine and the player's identity becomes known. The player's account may be credited with points based on activity that occurred at the gaming machine while the player's card remained inserted into the gaming machine. The end of the player tracking session occurs when the player card is removed from the card reader of the game.

Some prior devices continued to track gaming activity for a short period of time, typically 1-20 seconds, after player card removal. Also, as understood, a small delay will occur after card-out if data is not sent until specific accounting meter data is received after the player card has been removed from the gaming machine.

SUMMARY OF THE INVENTION

It is therefore an object of the present invention to provide a gaming system in which a player's gaming activity is tracked during a virtual session at an individual gaming machine.

It is yet another object of the present invention to provide game activity tracking both prior to card insertion and after card removal.

These and other objects are achieved in a method and apparatus using both regular gaming sessions and virtual gaming sessions to track player activity. Virtual gaming sessions may be established at various times. For example, in one embodiment a virtual gaming session is established after the player removes his or her player card while game credits remain on the credit meter. During the virtual gaming session, activity at the gaming machine is monitored until the virtual session ends, upon which activity data is transferred for adjusting the player's account. In another embodiment, a virtual gaming session is established after the player has inserted coins prior to the player inserting his or her player card.

BRIEF DESCRIPTION OF THE DRAWINGS

FIG. 3 is a table example of data reporting in the system of FIG. 1.

DESCRIPTION OF THE PREFERRED EMBODIMENT

Figure 1:
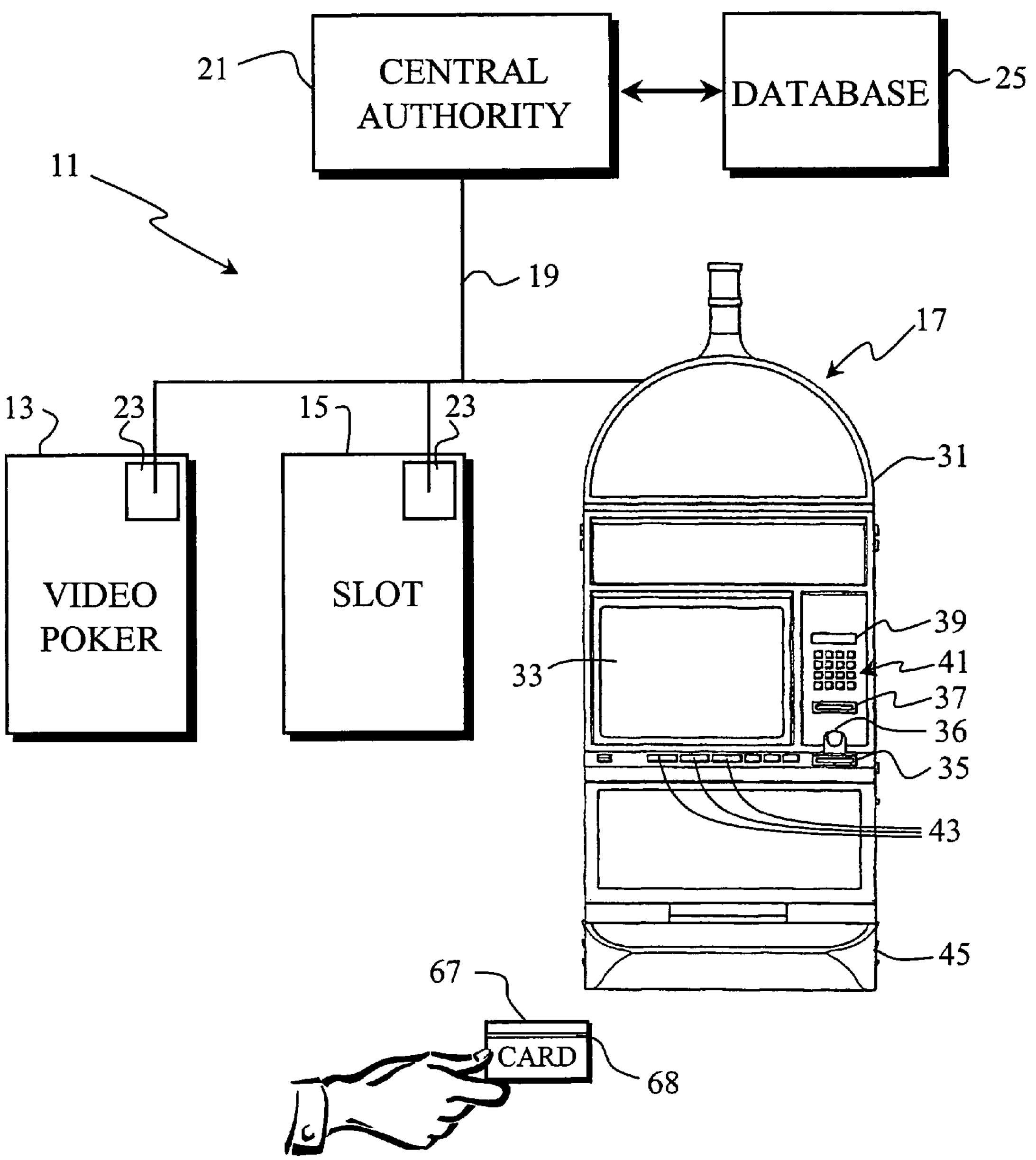
FIG. 1 is a block diagram of a gaming system according to an embodiment of the present invention.

Referring to FIG. 1, a gaming system 11 includes a plurality of gaming machines 13, 15 and 17 interconnected over a network 19 to a central authority 21. Where a large number of gaming machines are connected to central authority 21, network 19 may include subnetworks using RS485 serial protocol and data collection units (not shown). Network 19 also may be configured as an Ethernet network employing TCP/IP protocol, or may comprise a digital subscriber line (DSL) network, a fiber optic network, an RF network, etc.

Data is transmitted over network 19 between the gaming machines and central authority 21 which is formed of one or more computers. Each gaming machine includes a smart communication interface (SCI) 23 (FIG. 2) for control of communications over network 19. Interface 23 may be a microprocessor-based device, as for example, the Sentinel interface manufactured by Aristocrat Technology Inc. of Las Vegas, Nev., the assignee of the present invention. Central authority 21 stores game output data (received from the gaming machines) and may store game input data (to be sent to the gaming machines) in a central database 25.

As will suggest itself, more than the three gaming machines 13, 15 and 17 may be connected to network 19. Gaming machines 15 and 17 are slot electronic gaming machines and gaming machine 13 is a video poker electronic gaming machine. Other types of gaming equipment and gaming machines may be connected to network 19, including table games, which may or may not include virtual session tracking, as described hereafter.

Gaming machine 17 is shown in more detail and includes a housing 31 that supports a number of components including a main display 33 which is positioned on the outer front face of the machine for direct presentation of a display to the player. An input area 35 receives currency bills or bar-coded vouchers for wagering from the player. A card receiving slot 37 is positioned to receive a player card for use to identify the particular player at the gaming machine, as described hereinafter. A secondary display 39 also may be included, for the display of supplemental non-game information to the player, typically, in the form of instructions, points balances, or other information. As understood, all or part of supplemental display 39 may take the form of a display window located on primary display 33 or a secondary window on display 33. A keypad 41 is provided to allow the player to input data to the SCI of the gaming machine, particularly in response to instructions or questions on supplemental display 39. In addition, a plurality of decision making buttons 43 (and optionally a handle, not shown) are used by the player to play the game of machine 17. A payout tray 45 provides an area for redemption of awards based on play of the game, and a printer (not shown) may be used to print tickets or other redemption documents.

Display 33 displays the primary game features for play of a game. For example, the display may generate a conventional slot game in which a plurality of symbols are moved within their respective column, as if rotated, at the appropriate time in response to the user activation of the gaming machine.

Figure 2:
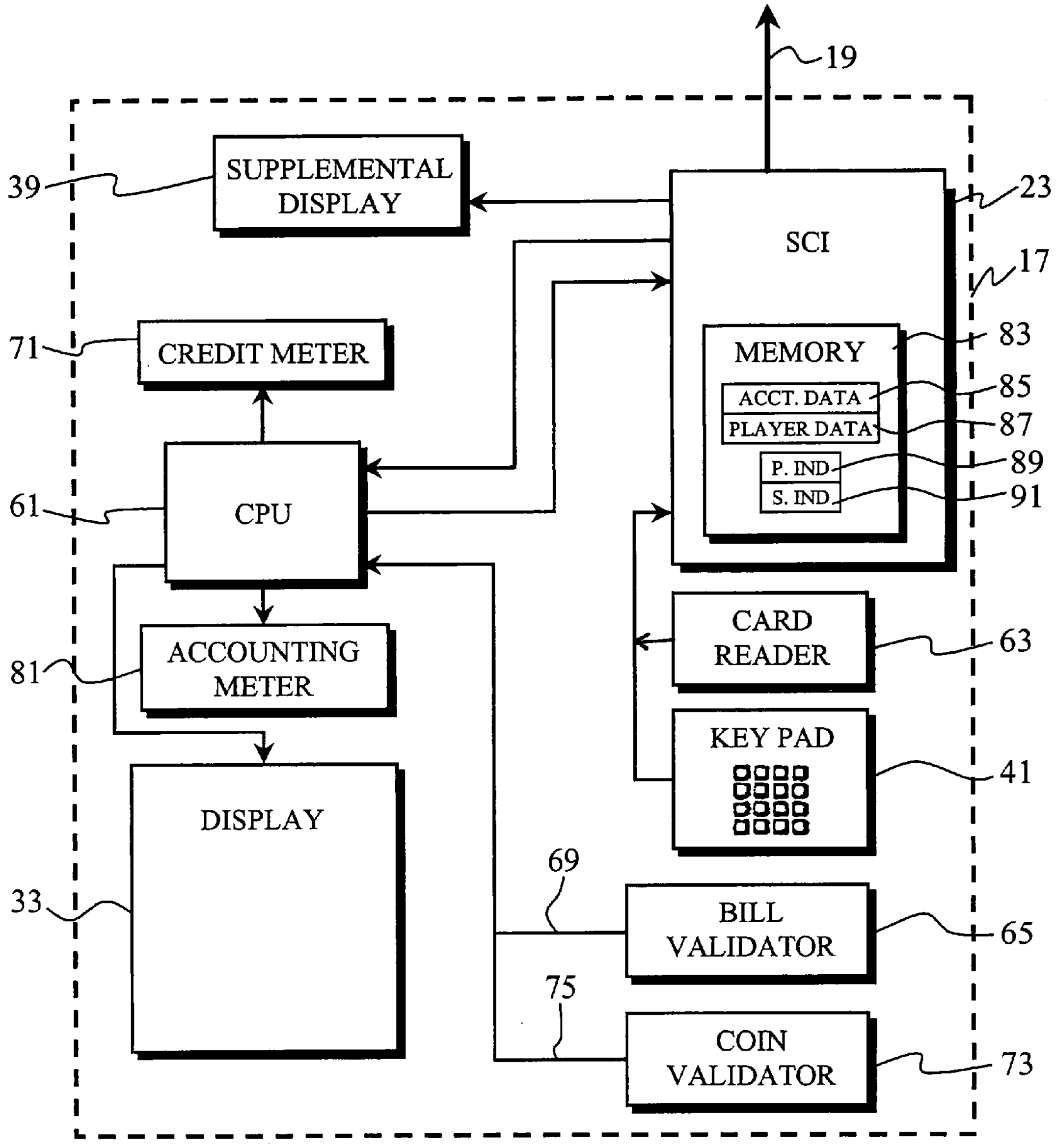
FIG. 2 is a block diagram of a gaming machine of the system of FIG. 1.

Referring now to FIG. 2, gaming machine 17 includes a game control CPU 61 which is responsible for carrying out the main functions of the gaming machine. CPU 61 executes each game as the player interacts with the gaming machine, including visually and/or audibly interacting with the player, as well as generating game outcomes. In addition, CPU 61 processes network information by receiving from, and sending data to, smart communication interface (SCI) 23. CPU 61 includes a microprocessor and associated memory (not shown particularly). Depending upon the type of gaming machine, CPU 61 may directly carry out some or all of the functions of the SCI 23.

Gaming machine 17 includes a number of peripheral devices including, for example, a card reader 63 and key pad 41. Card reader 63 and key pad 41 are used to identify the player at the gaming machine 17. The casino issues a player a player card 67 (FIG. 1) through an application process. Player card 67 typically includes a magnetic stripe 68 that is encoded with data to identify the player. In some cases, a personal identification number (PIN) is given to the player for security, and may allow access to certain features of the gaming machine. Card 67 is readable by a card reader 63 found in each of the gaming machines 13, 15, 17. Other types of cards may be utilized including optical cards, smart cards, etc.

In addition, a unique number is encoded onto a magnetic stripe 68 carried by the card. This unique number corresponds to a player account file which is maintained by central authority 21 in database 25. The account file may include information such as the player's name, address, amount of credit available, amount of promotional credits, amount of loyalty points, etc.

The player inserts his or her player card 67 into card receiving slot 37 (FIG. 1) for reading by card reader 63 (FIG. 2). SCI 23 detects the card insertion and receives the identification information contained on card 67. For example, the player's name, address and player tracking account number may be encoded on the magnetic stripe. The information contained on card 67 may be a reference number to retrieve player data from database 25.

SCI 23 provides display signals to display 39 in order to, for example, display the player's name, or other messages. Select messages may be displayed, for example, requesting the player to optionally enter his or her personal identification number (PIN) using keypad 41. Where the PIN is optionally entered by the player, SCI 23 communicates with the central authority in order that the PIN, for example, may be used to validate the player's identity. In other cases, the PIN may be required to access some features of the gaming machine 17 or system 11. Either the central authority or the SCI performs validation.

SCI 23 gains access to the player's account at the central authority. The player's account typically includes the number of player points (loyalty points) previously accumulated by the player, as well as additional statistics. In order for the gaming activity at a particular machine to be credited to the player's player account, the player or his account must be identified at the gaming machine. This is typically accomplished by the player inserting his or her player card.

As will suggest itself, a PIN alone without a player card may be used to provide player identity to the gaming machine; and a card alone without a PIN may be used to provide player identity to the gaming machine. Alternatively, any of several biometric devices may be used to identify the player, including devices to check finger prints, scan facial appearance, provide eye scans, etc. Such biometric input data may be used alone or in combination with player cards or PINS.

During game play, CPU 61 tracks gaming activity and provides such information to the SCI. Such information may include the amount of money the player has wagered on each game, the number of games played, the time each game was initiated and the particular identification of the gaming machine, etc. For example, a system may track money wagered, money won and the time period tracked. Such information may be obtained by the SCI polling the CPU. This game activity information is sent to the central authority by the SCI. The central authority utilizes the game activity information to perform accounting functions and additionally generates player points which are added to the points in the player's account. Awards are provided by the casino in accordance with points accumulated by the player.

Any prestored data in the player's account may be downloaded to SCI 23 which in turn provides corresponding signal data to CPU 61. Where gaming machine 17 allows for player selection of the particular game played, players may prestore their game preference in central database 25 (FIG. 1). Such preference data may be downloaded to gaming machine 17 after player identification at the gaming machine.

As understood, the communication between SCI 23, central authority 21 and CPU 61 may take on different forms and protocols, as for example, serial, parallel, ethernet, etc. In one embodiment, the SCI may be connected to the CPU 61 through a serial connection and communicates in accordance with a particular communication protocol or protocols depending upon the manufacturer of the particular gaming machine.

After a particular player has been identified as a valid player, other messages are presented on display 39. For example, the balance amount of points or credit remaining in the player's account may appear on the display. The player may use key pad 41 to download credits to the gaming machine, as described in U.S. Pat. No. 6,511,377 incorporated herein by reference.

Card reader 63 is housed in gaming machine 17, and positioned relative to card slot 37 to receive player card 67. Card 67 is inserted into reader 63 and information read from card stripe 68 is transferred to SCI 23 and stored in a memory 83 located in SCI 23.

A bill validator 65 is housed in gaming machine 17, and positioned relative to wager area 35 to receive currency bills which are inserted into validator 65 by a player. Bill validator 65, may receive several bill denominations, detects the denomination of an inserted bill and generates a signal 69 to CPU 61. Bill validator 65 may also receive encoded vouchers or tickets and responsively generate a proper signal 69 relating to ticket insertion.

CPU 61, for example, responds to signal 69 by increasing the value on a game credit meter 71. Depending on the type of gaming machine, the value of credit meter 71 may be displayed on display 33. Credit meter 71 provides a visual indication to the player of the number of game credits available for play. As understood, signal 69 may be sent to SCI 23, which in turn communicates with CPU 61 so as to change credit meter 71. This occurs where the bill validator is retrofitted into a gaming machine which was originally manufactured without a bill validator or had limited validation capabilities. CPU 61 will increase the credit meter after a ticket signal is received and value is determined.

A coin validator 73 is housed in gaming machine 11, and positioned relative to a coin slot 36 (FIG. 1) to receive coins which are inserted by a player into coin validator 73. Coin slot 36 may be positioned more to the left, as desired, and decision making buttons 43 may be modified in quantity or shape to accommodate the leftward position of coin slot 36. Coin validator 73 generates a coin signal 75 to CPU 61. CPU 61, for example, responds by increasing the value of credit meter 71.

In accordance with the particular configuration of gaming machine 17, the gaming machine begins a game (for example, the reels spin) automatically after the credits appear on the credit meter or the game is started after the player presses a button 43 or pulls a handle (not shown).

The game ends and a particular result appears. The gaming machine pays out certain amounts depending upon the result in a conventional manner. This may include applying an amount directly to the credit meter 71, or paying the amount in coins or tokens directly from the slot machine to the player at tray 45, or where the amount is above a threshold level, a hand pay is made of the amount to the player. The player may cash-out credits by activating a cash-out button 43 or upload credits to the player's account in database 25. A ticket printer (not shown) may be used to dispense bar coded vouchers on cash-out, as well.

If a player desires to discontinue play or move to a different machine, the player removes the player card. Thereafter, the player card may be inserted into the same or a different gaming machine for continuing play.

The player's account may be formed of multiple accounts, for example, a CASH account, a POINTS account, a PROMO account, etc. Credit may be placed in the player's PROMO account by the casino as a complimentary incentive. This may happen when a player first arrives at the casino at hotel check-in or other event. Alternatively, credit may be applied to the player's CASH account in accordance with the player making a deposit of money, either coins or tokens directly into the slot machine or at a cashier. Such credits (or value) may be downloaded to the gaming machine and placed on credit meter 71.

The player's gaming activity is tracked by system 11 once the player account is established, the player has been issued a player tracking card bearing a unique identification number and the account is in a file in database 25. The player's transactions at the gaming machine are logged by SCI 23 and reported to central authority 21.

In some situations, multiple player cards may be issued for a single account; each card will identify the same account. Each card may carry the same identification number. For example, a husband and wife may share a single account. The first card inserted allows the player to retrieve any or all of the credit available in the player's account. The second card inserted allows the second player to retrieve any remaining credit that remains in the account. Where both cards are simultaneously used on separate gaming machines, all player transaction activity is collected and forwarded to the player's account.

Numerous types of reports can be generated based upon the transaction activity logged in the player's account. For example, the amount of money played by the customer, the amount of credit used from the player's account, the amount of complimentary incentive credit utilized by the player, the amount of points converted to play credits at the game, the machine upon which the transaction occurred, the time of the play, or other event, etc.

Information Accounting by CPU 61

Referring again to FIG. 2, CPU 61 keeps a plurality of accounting meters 81 which log transaction and machine data. Such meters may be formed of electronic memory managed by CPU 61 and/or hard meters. CPU 61 responds to various gaming machine events and updates meters 81 accordingly. Meters 81 may be non-reset, accumulative meters; however, some meters 81 may be reset meters and statistics are available since the last reset of the meters. Basic events in which CPU 61 adjusts meters 81 may include:

(1) money input by the player;

(2) wagers placed by the player;

(3) game wins from play of the game; and (4) cash out of credits by the player.

Only the particular meters 81 to which an event pertains are adjusted upon the occurrence of the event. Data identifying the occurrence of events may be recorded also, including the time of the event and the particular type of event.

For example, meters 81 may include various drop meters to track money flow. A drop meter may be provided for each of the different forms of monetary value accepted by the gaming machine. For example, a coin drop meter may represent the total value of coins that fall to a "drop bucket" within the gaming machine housing for later collection by the casino. Also, coins may instead be diverted to a hopper system for later payout to the player and such diverted coins may be metered separately. Also, a bill count drop meter may count all paper currency that has been inserted into the bill acceptor. As another example, promo count meters count promotional credits that are received by the gaming machine from bar coded coupons, downloaded credits, bonus point conversions, and the like. Outflow of cash to the player may also be tracked by meters, including printed vouchers that have been issued by the machine.

Meters 81 may also keep track of game activity and include a game play meter for tracking the total number of bets actually wagered and a game win meter for tracking the total number of wins. Purchased credits which are not wagered, but cashed out, may be tracked as well. Credit meter 71 is a visual meter which reflects the total amount of credit available to the player at any time, and may be driven from another meter 81.

SCI 23 Retrieves Data From CPU 61

CPU 61 communicates data to SCI 23 including events and readings of the accounting meters 81. For example, SCI 23 may poll CPU 61 for data, and then record such data in a memory 83. The data may be further processed by SCI 23, and then the processed data is stored in memory 83. Particular data stored in memory 83 includes accounting data 85 as well as player data 87 which is used to award player points.

SCI 23 performs game accounting functions by updating accounting data 85 and player data 87. SCI 23 transmits data 85 and 87 to central authority 21. In addition, accounting data 85 and player data 87 may be initialized by central authority 21.

Type of Information Reported

As understood, tracking of data at the gaming machines occurs for carded and non-carded players. A non-carded player is a player who does not insert a player card during play. SCI 23 may retrieve data from CPU 61 including data stored by CPU 61 in meters 81. SCI 23 may also keep its own data that it has obtained from sources other than CPU 61, as for example, data obtained from card reader 63. SCI 23 may process the data and convert it to a particular form prior to transmittal to central authority 21. For example, data as to the number of coins played during a certain period of time may be calculated by SCI 23 based on coin-in meter data at the start of the period and coin-in meter data at the end of the period. Also, SCI 21 could transmit meter data from the start of the period and the end of the period to the central authority 21.

SCI 23 reports certain data to central authority 21 which is placed in database 25. However, SCI 23 reports particular data, i.e., player data 87, which is related to the game activity of the player. Player data 87 is necessary for central authority 21 to calculate player points and store these player points in a particular player account held in database 25. For example, central authority 21 may calculate a number of loyalty points based on coin-in data of the player, and thereafter store points data in the player account. As understood, SCI 23 instead could perform points calculation, and thereafter transmit the points data for storage in the player account in database 25.

When Information is Reported

SCI 23 may report a variety of accounting data to central authority 21 at various times. However, SCI 23 reports player data 87 which SCI 23 has accumulated in connection with the occurrence of a regular gaming session and a virtual gaming session. If player data 87 exists at certain predetermined times, described hereafter, it is reported to central authority 21.

Where a player has the ability to convert points stored in his or her account to credits at the gaming machine, the timing of points creditation to the player account becomes important.

In some cases, it may be desirable also to forward player data 87 at other predetermined times, for example, every hour, where the player's regular gaming session occurs over a lengthy period of time.

Regular Gaming Session

Player data 87 is recorded for each gaming session of a player, at a gaming machine. Each gaming session may be formed from one or more "regular" gaming sessions and one or more "virtual" gaming sessions. At the end of the player's regular or virtual gaming session, player data 87 may be forwarded over network 19 to central authority 21 for storage in the player's account.

A regular gaming session of an individual player is a period of time which begins with the insertion of the player's player card at a single gaming machine (or gaming table or gaming area), and ends with the removal of the player's player card at that single gaming machine (or that gaming table or gaming area). During a regular gaming session, player data 87 (or data upon which it is based) is developed in meters 81 by CPU 61, for example, or stored in memory 83 by SCI 23. At the end of the regular gaming session, SCI 23 completes the storage of player data 87, if necessary, and transmits the player data to central authority 21 for storage in the player's account. SCI 23 may cause transmittal of player data 87 at the end of a regular gaming session.

As shown in FIG. 2, SCI 23 generates a primary indicator 89 which is active during a regular gaming session and inactive at all other times. Indicator 89 provides an electrical indication of either an active state or an inactive state, and may merely be a flag set in memory 83 that may be inspected by the software program of SCI 23.

Upon insertion of a player card in card reader 63, and after a determination of the identity of the player or the validity of the player card, SCI 23 sets its primary indicator 89 to an active state. Upon removal of a player card from card reader 63, SCI 23 is notified and SCI 23 sets primary indicator 89 to an inactive state. SCI 23 responds to the primary indicator, as described below, to process player data 87.

Virtual Gaming Session

Player data 87 is also recorded for each virtual gaming session of a player. There may be several types of virtual gaming sessions. For example, a first type of virtual gaming session of an individual player is a period of time which begins after completion of the regular gaming session of the individual player. A second type of virtual gaming session may occur before player card insertion where the player has inserted value, coins for example, into the gaming machine.

As shown in FIG. 2, SCI 23 generates a secondary indicator 91 which is active during a virtual gaming session. Indicator 91 provides an electrical indication of either an active state or an inactive state, and may merely be a flag set in memory 83 that may be inspected by the software program of SCI 23.

For example, upon (1) the removal of the player's player card and (2) if the credit meter is non-zero and/or the last game is not over, SCI 23 sets its secondary indicator 91 to an active state indicating a virtual gaming session. The virtual gaming session of the individual player ends, for example, when (1) the credit meter is zero and (2) the last game is over. As another example, the virtual gaming session ends where the last player to play the gaming machine reinserts his or her player card again into the gaming machine; the SCI 23 ends the virtual gaming session and begins a regular gaming session. The SCI responds to the secondary indicator, as described below, to process player data 87.

As described below, a virtual gaming session may end upon an elapsed time from (1) the removal of the player card or (2) the removal of an employee card which was inserted during a virtual gaming session. A virtual gaming session may end upon an elapsed time from other events, as for example, credit meter 71 reaching a zero balance or the last detected player activity. This elapsed time may be established by the casino configuring a "virtual session timeout" parameter in the SCI via central authority 21. This timeout ends a virtual gaming session irrespective of whether credits remain on the credit meter or whether the last game at cardout has been completed. As will suggest itself, multiple timeout parameters may be used in combination for ending virtual sessions.

Employee Cards

Employees of the casino have employee cards which are insertable into a gaming machine. The employee card may include a magnetic stripe which is read upon insertion to alert SCI 23 that an employee is present at the gaming machine. Thereafter, particular functions of the gaming machine (or SCI 23) are made available to the employee. An employee may have occasion to insert his or her employee card into the gaming machine during a virtual session at that gaming machine. For example, the player removes his or her player card while credits remain on the credit meter or while a game is in progress and then the employee inserts his or her employee card. The normal employee functions will be available while the employee card is inserted. Meter changes that occur while an employee card is inserted will be attributed to the virtual session of the player. Ordinarily, a virtual session will not end so long as the employee card is inserted into the gaming machine. An exception, however, is that one of the employee functions may be to allow the employee to force a virtual session to end. Also, the employee may force the credit meter 71 to zero which in turn may end a virtual session or end a game in progress.

When an employee card is inserted into reader 63, SCI 23 recognizes the card as an employee card. Normally, the insertion of an employee card will not cause SCI 23 to reset secondary indicator 91 to its inactive state. If the employee functions permit the employee to force a virtual session to end, then that employee function resets secondary indicator 91 to its inactive state terminating the virtual session and player data is sent to central authority 21. As will suggest itself, the secondary indicator 91 may be maintained independently of primary indicator 89. In such a case, if the primary indicator 89 is active then a regular gaming session is in progress; otherwise, if the primary indicator 89 is inactive and the secondary indicator 91 is active then a virtual gaming session is in progress. Alternatively, a single indicator with three states could be used: no gaming session in progress, regular gaming session in progress, and virtual gaming session in progress.

Display During Virtual Session

In order to alert the player that a virtual session is occurring, a message may be displayed. The message, for example, may state: VIRTUAL SESSION IN PROGRESS. The SCI controls display 39 to start displaying the message at the beginning of the virtual session and to stop displaying the message at the end of the virtual session. The display software of SCI 23 may monitor the state of secondary indicator 91 for determining the particular display information to send to display 39 (or to display 33, as discussed above).

However, if an employee card is inserted during a virtual session, then normal employee menus are displayed on display 39. Should a player card be inserted during a virtual session, the virtual session does not end immediately, but waits until the card has been read. If that card cannot be read then the normal message such as BAD CARD READ will be displayed on display 39 instead of VIRTUAL SESSION IN PROGRESS. Where the card inserted during a virtual session is recognized to be that of a different player (different than the player associated with the virtual session) then a message such as DIFFERENT PLAYER may be displayed to alert the new player, but the virtual session of the original player will remain in progress.

Referring now to FIG. 3, an example of activity at various times is represented by the illustrated table. At 6:00 a.m., a player inserts his or her player card into a gaming machine. The SCI retrieves the player information from the card. The SCI also retrieves a number of meter readings from CPU 61, including for example, a reading of 600 on the coin-in meter, a reading of 600 on the coin-out meter and a reading of 0 on the credit meter. The SCI stores this information as account data 85 in memory 83. SCI 23 sets primary indicator 89 to its active state.

At 6:10 a.m., the player removes his or her player card from the gaming machine. SCI 23 retrieves the meter readings from CPU 61, for example, a reading of 620 on the coin-in meter, a reading of 600 on the coin-out meter and a reading of 10 on the credit meter. The SCI stores this information as account data 85 in memory 83. SCI 23 resets primary indicator 89 to its inactive state.

At 6:10 a.m., SCI 23 sends player data 87 for the regular gaming session to the central authority 21 (CA), including, for example, that the regular session started at 6:00 a.m., that 20 coins were inserted into the gaming machine, that 0 coins were paid out to the player and the lapsed time of play was 10 minutes. This player data 87 was generated by SCI 23 based on data 85. As understood, other information may be sent to central authority 21 as well or instead.

Because there remains 10 credits on the credit meter at the time of card-out, a virtual gaming session begins at card out, i.e., at 6:10 a.m. Secondary indicator 91 is set to its active state.

An employee card is inserted at 6:10 a.m. The SCI retrieves data from meters 81, showing that the meters remained the same upon employee card insertion. Because the card inserted was an employee card, secondary indicator 91 is not reset to its inactive state.

At 6:12 a.m., the employee card is removed. The SCI retrieves data from meters 81, showing that the meters are at the same value as they were at the time of the employee card insertion. The secondary indicator 91 remains in its active state.

At 6:13 a.m., the same player again inserts his or her card. The SCI retrieves player identification information and recognizes that the same player has reinserted his or her player card. The SCI uses the meter values that existed at the start of the virtual session at 6:10 a.m., so as to effectively combine any data occurring during the virtual session into the new regular gaming session; or, in other words, to effectively treat the regular gaming session as though it had begun at the start of the virtual session. Thus, any player data occurring during the virtual session is not sent to the central authority at the time of card reinsertion, i.e., at 6:13 a.m. The SCI resets secondary indicator 91 to its inactive state indicating that the virtual session is over and sets indicator 89 to its active state indicating that a regular gaming session is in progress.

At 6:20 a.m., the player removes his or her player card from the gaming machine. SCI 23 retrieves the meter readings, for example, a reading of 650 on the coin-in meter, a reading of 625 on the coin-out meter and a reading of 0 on the credit meter. Primary indicator 89 is reset to its inactive state indicating that the regular gaming session is completed. The secondary indicator remains reset because the credit meter equals zero and the last game has been completed.

At 6:20 a.m., the SCI sends player activity data 87 for both the virtual and regular gaming session to the central computer, including, for example, that the virtual/regular session started at 6:10 a.m., that 30 coins were inserted into the gaming machine, that 25 coins were paid out to the player and that the lapsed time of the virtual/regular session was 10 minutes. The session ended without the start of a second virtual session because at card-out there were 0 credits on the credit meter and the last game was completed. Thus, the secondary indicator 91 remained in its inactive state. If credits had remained on the credit meter, for example, a virtual session would have begun at card out.

Figure 4A:
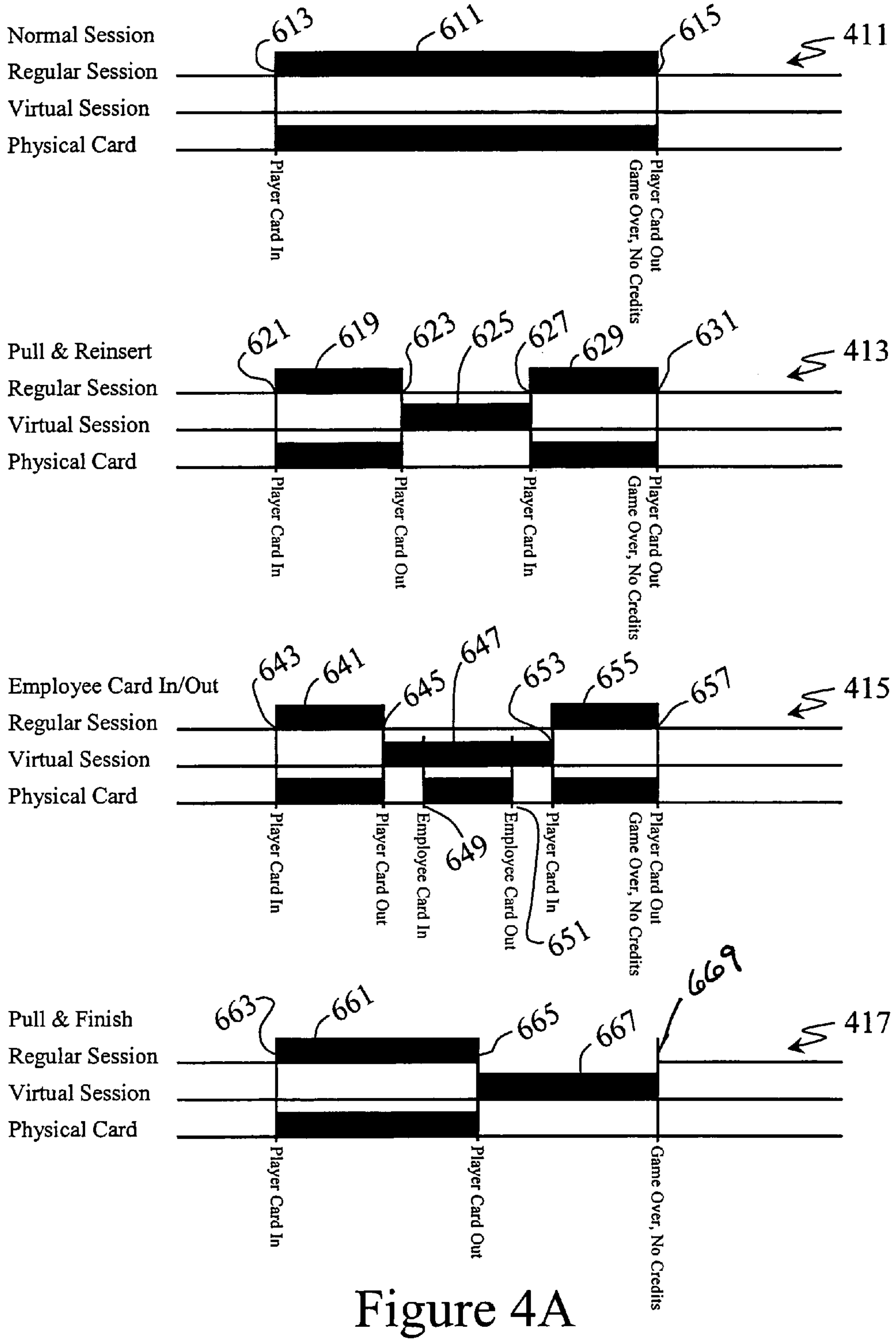
FIGS. 4A, 4B and 4C are example time charts demonstrating embodiments of the gaming system of FIG. 1.
Figure 4B:
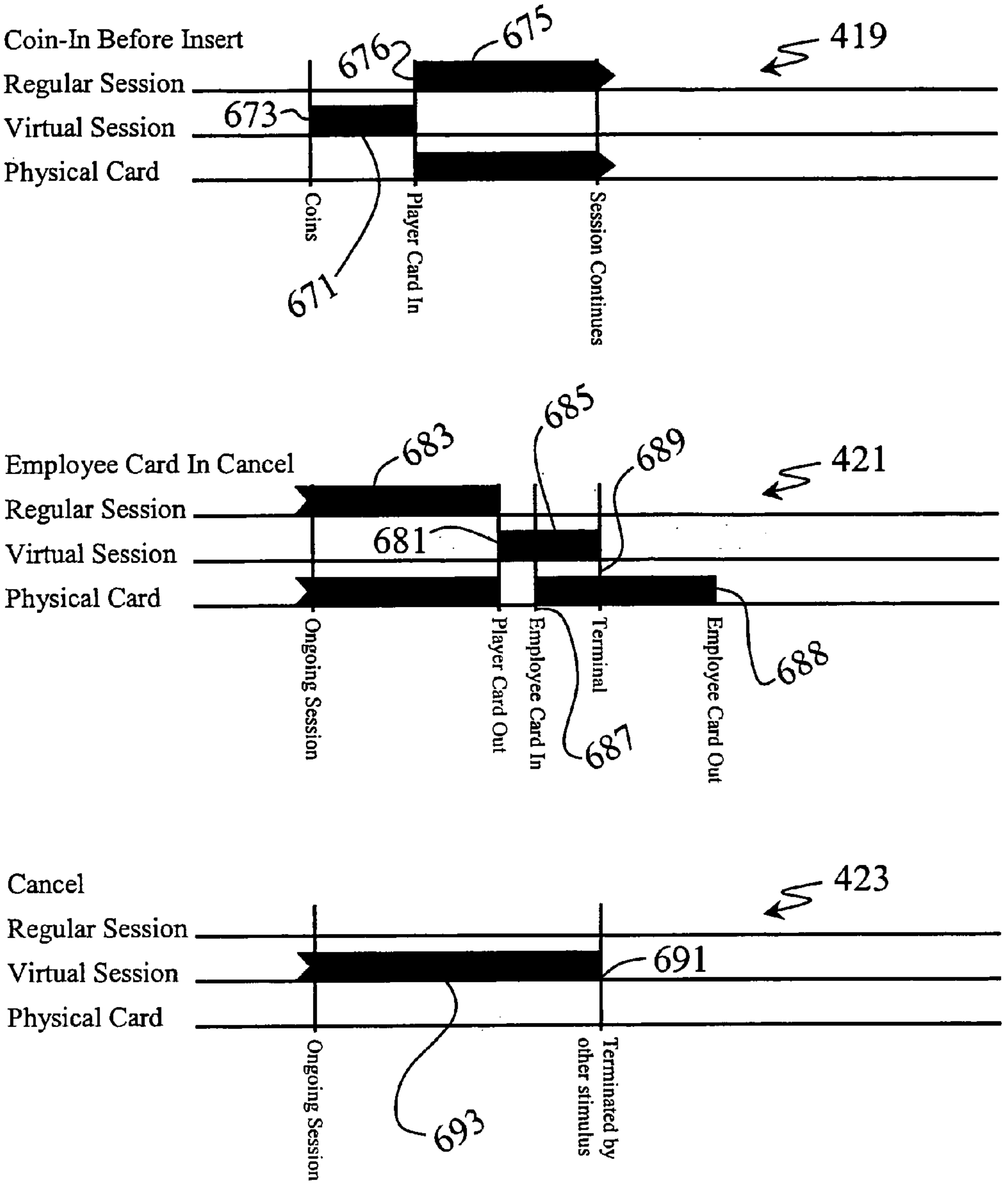
Figure 4C:
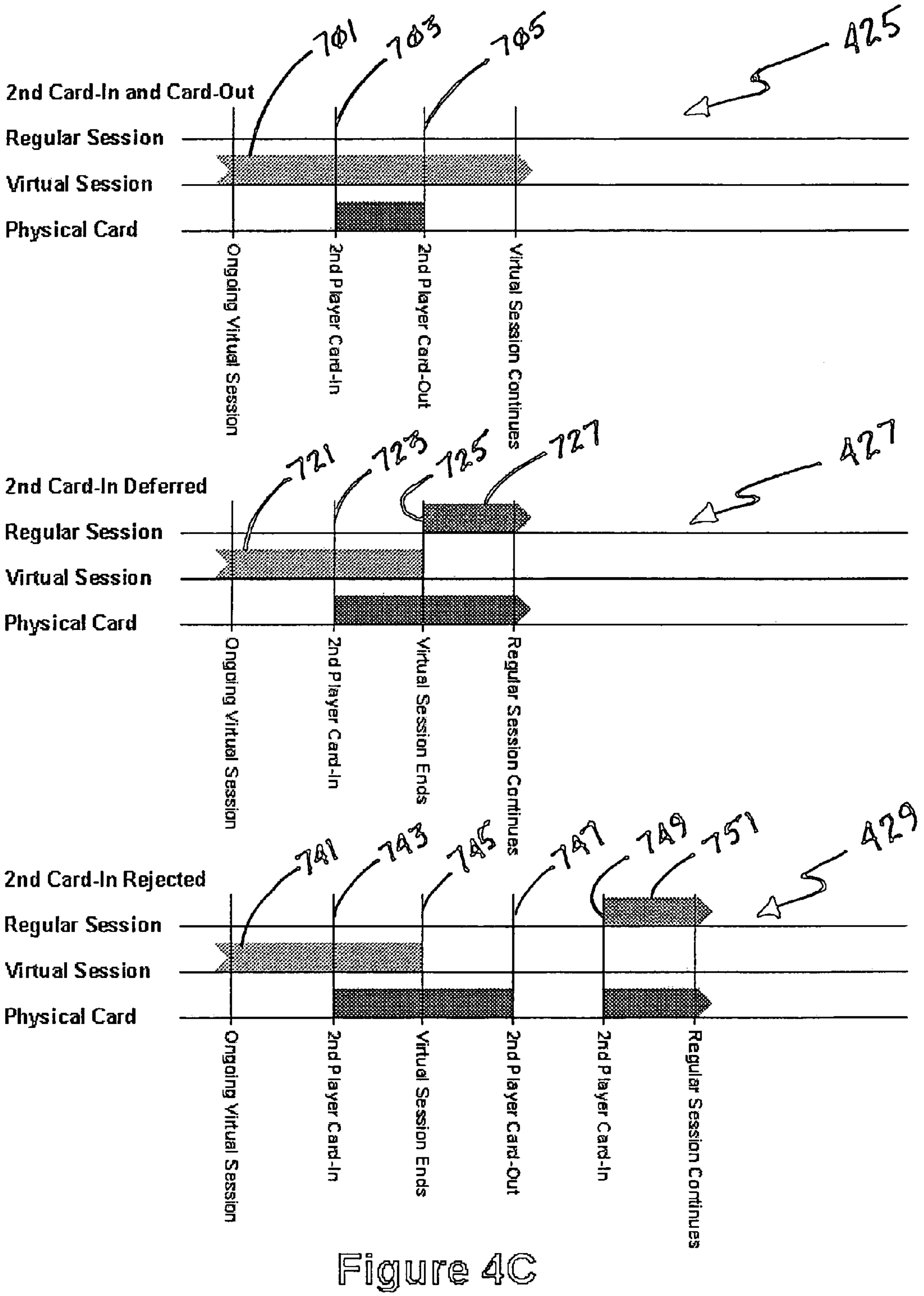

Referring to FIGS. 4A, 4B and 4C, various session examples are diagrammed. In Example 411, a regular gaming session 611 begins at time 613, the time that the player inserted his or her card. The card physically remains inserted in the card reader of the gaming machine until removed at time 615. At time 615, SCI 23 transmits player data 87 to the central authority. The last game is over at time 615 and there are no credits on the credit meter at time 615. No virtual session occurs in example 411 since at time 615 the game was over and no credits remained on the credit meter. Primary indicator 89 was set to its active status at time 613 and reset to its inactive state at time 615.

In example 413, a regular gaming session 619 begins at time 621, the time that the player inserted his or her card. The card physically remains inserted in the card reader of the gaming machine until removed at time 623. At time 623, SCI 23 may transmit player data 87 to the central authority. A virtual gaming session 625 begins at time 623 because either (1) credits remain on the credit meter or (2) the last game has not been completed. At time 627, the same player reinserts his or her player card. SCI 23 recognizes that the same player has reinserted his or her card during the virtual session. The virtual session ends at time 627 and a regular session 629 begins at time 627. The regular session ends at time 631 when the player removes the card; there are no credits on the credit meter and the game session is over. Player data 87 based on virtual session 625 and regular session 629 is transmitted to the central authority at time 631.

Example 415 diagrams the event of an employee card used during a virtual session. A regular gaming session 641 begins at time 643, the time that the player inserted his/her card. The card physically remains inserted in the card reader of the gaming machine until removed at time 645. At time 645, SCI 23 transmits player data 87 to the central authority. A virtual session 647 begins at time 645 since credits remain on the meter or the last game has not been completed.

At time 649, during the virtual session 647, an employee inserts his or her employee card. The card physically remains inserted in the card reader of the gaming machine until removed at time 651. The virtual gaming session 647 continues during the time that the employee card remains inserted. The virtual session 647 continues until time 653 upon which the same player again inserts his or her player card into the gaming machine. SCI 23 recognizes that the same player has inserted his or her card during the virtual session and ends the virtual session 647 at time 653. A regular gaming session 655 begins at time 653 and ends when the player's card is removed at time 657. No virtual session begins at time 657, since the last game played is over and no credits remain on the credit meter. Player data 87 based on virtual session 647 and regular session 655 is transmitted to the central authority at time 657.

In example 417, a regular gaming session 661 begins at time 663, the time that the player inserted his or her card. The card physically remains inserted in the card reader of the gaming machine until removed at time 665. At time 665, SCI 23 transmits player data 87 to the central authority. A virtual session 667 begins at time 665 since either credits existed on the credit meter at time 665, or the last game played had not been completed at time 665. At time 669, the virtual session ends since a point in time has been reached where the last game played is over and no credits remain on the machine. At time 669, SCI 23 sends player data 87 related to virtual gaming session 667 to the central authority 21. As described above, time 669 could instead be the expiration of a time-out period, which causes the virtual gaming session to be cancelled, irrespective of whether the last game is over or whether any credits remain on the credit meter.

In example 419, a virtual gaming session 671 begins at time 673, the time that the player inserts coins into the gaming machine. No player card is inserted into the card reader of the gaming machine at time 673. A regular gaming session 675 begins at time 676, the time that the player inserts his or her card. The card physically remains inserted in the card reader of the gaming machine until removed at a later time. Player Data 87 regarding virtual session 671 is maintained in memory 83 and added to player data regarding regular session 675, for transmission to central authority 21 at a later time.

In example 421, the player removes his or her player card at time 681, thus ending the regular gaming session 683. At time 681, SCI 23 transmits player data 87 to the central authority. A virtual session 685 begins at time 681. An employee inserts his or her employee card during the virtual session at time 687. The employee operates the gaming machine functions so as to terminate the virtual session at time 689. The employee card physically remains in the gaming machine after time 689 and is not removed until time 688. At the termination of virtual session 685, at time 689, SCI 23 transmits player data 87 for virtual session 685 to the central authority for storage in the player's account. Alternatively, SCI 23 may transmit player data 87 for virtual session 685 at time 688.

In example 423, a virtual session is ongoing and is terminated at time 691 due to a stimulus other than an employee carded function. For example, the virtual session 693 is terminated upon a time-out period previously specified by the casino. The termination may be caused by instructions from central authority 21 to SCI 23. At time 691, SCI 23 transmits player activity data 87 for virtual session 693 to the central authority for storage in the player's account.

In Example 425, virtual session 701 is already in progress for a first player. At time 703, a card for a second player is inserted. Supplemental display 39 indicates that a virtual session for another player is still in progress or indicates that the card insertion was not processed. At time 705, the card for the second player is removed. Supplemental display 39 indicates that a virtual session is still in progress. Virtual session 701 is not interrupted by the card insertion and removal.

In example 427, virtual session 721 is already in progress for a first player. At time 723, a card for a second player is inserted and player identification information for the second player is saved for possible future use at time 725. Supplemental display 39 indicates that a virtual session for another player is still in progress. At time 725, virtual session 721 ends because the last game played is over and no credits remain on the machine. After time 725, SCI 23 sends account data 85 and player data 87 related to virtual session 721 to central authority 21. At time 725, regular session 727 begins and the previously saved player identification information for the second player is stored in account data 85. Supplemental display 39 indicates that a regular session is now in progress.

In an alternative example 429, virtual session 741 is already in progress for a first player. At time 743, a card for a second player is inserted. Supplemental display 39 indicates that the card insertion was not processed. At time 745, virtual session 741 ends because the last game played is over and no credits remain on the machine. After time 745, SCI 23 sends account data 85 and player date 87 related to virtual session 741 to central authority 21. Supplemental display 39 continues to indicate that the card insertion was not processed. At time 747, the card for the second player is removed. At time 749, the card for the second player is inserted again and regular session 751 begins.

When compared to example 427, an advantage of example 429 is that SCI 23 does not need to store player identification information for the second player while the virtual session for the first player is still in progress.

It is generally unattractive or disadvantageous to end immediately a virtual session for a first player when a card for a second player is inserted. If this is done, it could allow a player to cause one type of activity to be attributed to one account and a different type of activity to be attributed another account, possibly giving the player an unfair advantage.

Figure 5:
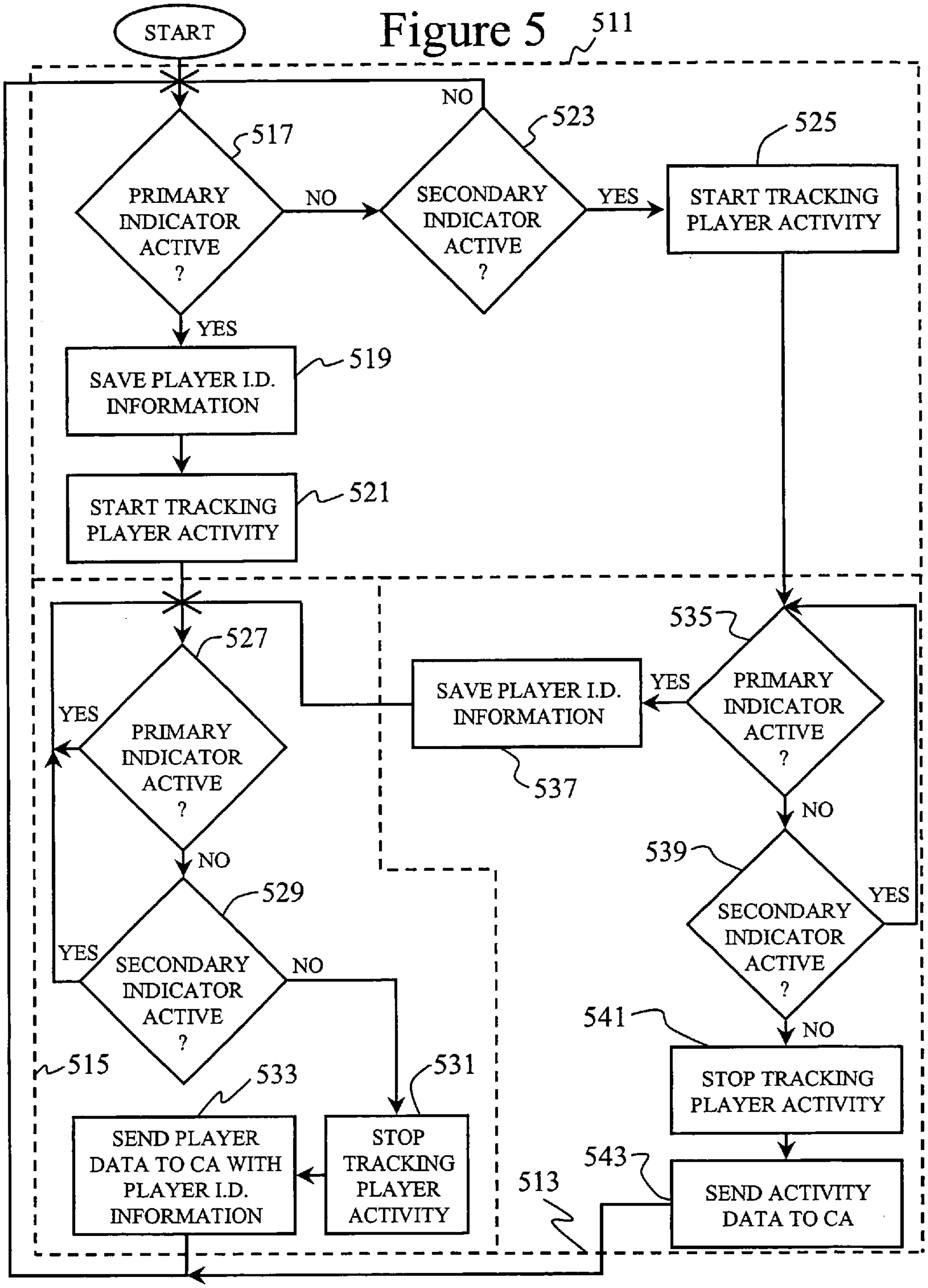
FIG. 5 is a flow chart of one embodiment of the gaming system of FIG. 1.

Referring to FIG. 5, one embodiment of a flow of the operation of SCI 23 may be described with respect to three separate states. In a STATE ZERO, indicated by reference numeral 511, the status of primary indicator 89 and secondary indicator 91 are monitored. Depending on the status of each indicator 89, 91, either a STATE ONE 513 or a STATE TWO 515 is entered.

In STATE ZERO, the status of the primary indicator is checked at step 517. If the primary indicator is active (indicating a player card has been inserted), player identification information is saved at step 519, the tracking of player activity begins at step 521, and the flow is passed to STATE TWO. In STATE TWO, the flow waits for the removal of the player card, no credits on the credit meter, and the last game completed, and then transmits player data to the central authority.

If the primary indicator is not active as determined in step 517, the status of the secondary indicator is checked at step 523. If the secondary indicator is active (indicating that a coin has been inserted prior to card-in), the tracking of player activity begins at step 525, and the flow is passed to STATE ONE. In STATE ONE, the flow waits for the insertion of a player card in order to identify the player to whom the activity may be credited.

Referring now to STATE TWO, the primary indicator is monitored at step 527, for a change to an inactive state (indicating the removal of the player card). Upon detecting an inactive state of the primary indicator, the state of the secondary indicator is checked at step 529. If the secondary indicator is not active (indicating that no credits remained on the credit meter at card-out and that the last game was completed at card-out), then tracking stops at step 531, and player data is sent with player identification information to the central authority at step 533. The flow then returns to STATE ZERO.

In STATE TWO, the primary indicator changes to its active state upon insertion of the same card. The primary indicator will then be monitored at step 527 for a change to its inactive state (indicating card-out).

In STATE TWO, if a different player card is inserted, player identification information for the new player is saved for possible future use in step 519 while maintaining the information for the previous player. The primary indicator is not set active, the secondary indicator is not reset and tracking of activity on behalf of the previous player continues as described above. After the credits attributed to the previous player are played out, and the last game started with those credits has completed, tracking stops for the previous player at step 531 and player data and player identification of the previous player will be transmitted to the central authority at step 533. The primary indicator is set active indicating that the new player card is inserted and flow then returns to STATE ZERO. The previously saved player identification information for the new player will be used in step 519, and tracking on behalf of the new player will begin at step 521.

In STATE TWO, if the new player removes his or her player card prior to the credits of the previous player being played out, the active state of the secondary indicator will be detected at step 529 and flow will continue normally. The previously saved player identification information for the new player will not be used.

Referring now to STATE ONE, the state of the primary indicator is monitored at step 535 to determine if it has become active (indicating card insertion after coin insertion). Upon detection of an active state of the primary indicator at step 535, player identification information is saved at step 537, the tracking of the player activity continues and STATE TWO is entered in order to wait for card-out and transmission of the player data to the central authority. If the primary indicator has not become active, the secondary indicator is monitored at step 539 to determine if its state has returned to an inactive state. The state of the secondary indicator may be reset to an inactive state when there are no credits remaining on the credit meter and the last game has completed, or after a predetermined period.

A time-out period is monitored which represents a predetermined time within which to wait for the player to insert a player card after coins or value has been inserted into the gaming machine. The change to an inactive state of the secondary indicator will be detected at step 539, tracking of player activity will stop at step 541, and activity data may be sent to the central authority at step 543. The flow then returns to STATE ZERO.

As understood, the identification of the player and the generation of the state of the primary indicator may be performed by a magnetic card reader, an optical card reader, a card swipe reader, a card insertion reader, a smart card reader, or other device which alerts SCI 23 by providing SCI 23 with player identification information of the player who is about to activate play on the gaming machine. Devices other than card readers may be used to provide identification information and to activate the primary indicator, as for example, a biometric sensor, a fingerprint sensor, a palm sensor, a hand sensor, an eye sensor, an iris sensor, a visual recognition system, an audio or voice recognition system, which provide player identity information to SCI 23 at the time that the player is about to commence play. As understood, player or employee identity information may be transferred by radio waves or infra-red radiation from a portable, or handheld device. Additionally, a casino employee using keypad 41 for example, may instruct SCI 23 to set the primary indicator 89 to an inactive state, or the central authority may be used to instruct SCI 23 to set the primary or secondary indicator to an inactive state.

As understood, the primary indicator 89 is reset to an inactive state upon card-out. Other means may be used to allow the player to indicate that his or her play is completed. For example, where identity information is provided by a biometric device and a player card is not used, the primary indicator may be reset and the secondary indicator set active when the player identification information is no longer being provided or when the source of the player identification information is no longer present. As understood, the primary indicator state may be determined in a number of ways, including sensors such as audio, visual, thermal, motion, infra-red, magnetic, light detectors, etc.

As is understood, the secondary indicator is reset to an inactive state when no credits remain on the credit meter and the last game has completed or after a period of time. Additionally, the secondary indicator state may be determined in a number of ways, including sensors such as audio, visual, thermal, motion, infra-red, magnetic, light detectors, tactile, position, etc.

When employee identification information is provided by a biometric device and an employee card is not used, the primary indicator may be reset and a tertiary indicator set active when the source of employee identification information is longer present. While active, the tertiary indicator can be used to indicate the presence of an employee. The tertiary indicator can be set inactive by an employee instructions or after a period of time.

As is understood, the player identification information may be used to identify a player who is associated with a player account. Also, the player identification information may be used to identify a player account without identifying the player.

As is understood, the activity data sent to the central authority can include state information from which types or amounts of player activity may be determined. Also, the activity data can include types or amounts of player activity.

As is understood, a casino employee includes anyone who performs non-player activities on a gaming machine.

As is understood, a central authority may comprise multiple devices. These multiple devices may be distributed across multiple locations. A database may comprise multiple databases or stores of information. These databases or stores of information may be contained on multiple devices. Data stored in the database may be combined with other information when stored. Data stored in the database may be summarized when stored in the database.

As is understood, information sent to central authority 21 may be buffered for a period of time before it reaches the central authority. This buffering may take placed on SCI 23. Also, the information may be transformed before it reaches the central authority.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A method of operating a gaming system having a central authority associated with a database and interconnected to a plurality of gaming machines, comprising:

establishing in the database a player account associated with at least one player;

providing a player card to the one player, said player card being associated with the player account;

identifying a start of a first regular gaming session associated with the player account, wherein said start of the first regular gaming session occurs in response to an insertion of the player card into the one gaming machine;

identifying an end of the first regular gaming session associated with the player account, wherein said end of the first regular gaming session occurs in response to a removal of the player card from the one gaming machine;

collecting first activity data from the one gaming machine, wherein said first activity data corresponds to player activity on the one gaming machine that occurred during the first regular gaming session;

subsequent to the removal of the player card from the one gaming machine, identifying a start of a first virtual gaming session associated with the player account, wherein said start of the first virtual gaming session occurs in response to an indication that the removal of the player card occurred while a game was in progress on the one gaming machine, while credits were available for play on the one gaming machine, or both;

identifying an end of the first virtual gaming session associated with the player account, wherein said end of the first virtual gaming session occurs in response to either re-insertion of the player card into the one gaming machine or all credits left over from the regular gaming session being spent;

collecting second activity data from the one gaming machine, wherein said second activity data corresponds to player activity on the one gaming machine that occurred during the first virtual gaming session;

transmitting the first activity data and the second activity data to the central authority; and storing in the player account of the database information based on the first activity data and the second activity data.

2. A method according to claim 1 wherein said step of transmitting consists of transmitting the first activity data and the second activity data at two separate times.

3. The method according to claim 1 wherein the value entered on the one gaming machine comprises coins.

4. The method according to claim 1 and further including:

identifying a start of a second regular gaming session associated with the player account, wherein said start of said second regular gaming session occurs after the end of the first virtual gaming session and in response to the re-insertion of the player card into the one gaming machine;

identifying an end of the second regular gaming session associated with the player account, wherein said end of the second regular gaming session occurs in response to a second removal of the player card from the one gaming machine;

collecting third activity data from the one gaming machine, wherein said third activity data corresponds to player activity on the one gaming machine that occurred during the second regular gaming session;

transmitting the third activity data to the central authority; and storing in the player account of the database information based on the third activity data.

5. A method according to claim 2 wherein said first activity data is transmitted at the end of said first regular gaming session and said second activity data is transmitted at the end of said first virtual gaming session.

6. A method according to claim 4, wherein the second activity data is combined with the third activity data and transmitted as combined session data at the end of the second regular gaming session.

* * * * *

UNITED STATES PATENT AND TRADEMARK OFFICE

CERTIFICATE OF CORRECTION

PATENT NO. : 7,909,693 B2
APPLICATION NO. : 10/720931
DATED : March 22, 2011
INVENTOR(S) : Keith D. Kammler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1267 days.

Signed and Sealed this
Fourth Day of October, 2011

David J. Kappos
*Director of the United States Patent and Trademark Office*